(12) United States Patent
Rollin et al.

(10) Patent No.: US 7,707,256 B2
(45) Date of Patent: Apr. 27, 2010

(54) SUGGESTING MEETING LOCATIONS FOR CONDUCTING MEETINGS

(75) Inventors: Kelly E. Rollin, Seattle, WA (US); Sumit R. Chakravarty, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 11/559,501

(22) Filed: Nov. 14, 2006

(65) Prior Publication Data

US 2008/0114840 A1 May 15, 2008

(51) Int. Cl.
G06Q 10/00 (2006.01)
G06K 7/10 (2006.01)

(52) U.S. Cl. .............. 709/206; 705/5; 705/6; 705/8; 705/9; 235/377; 707/102

(58) Field of Classification Search .......... 705/1, 705/8, 9, 15
See application file for complete search history.

(56) References Cited

U.S. PATENT DOCUMENTS

| | | | | |
|---|---|---|---|---|
| 5,124,912 | A * | 6/1992 | Hotaling et al. ........... | 705/9 |
| 5,323,314 | A * | 6/1994 | Baber et al. .............. | 705/8 |
| 6,101,480 | A * | 8/2000 | Conmy et al. ............. | 705/9 |
| 6,434,571 | B1 * | 8/2002 | Nolte ..................... | 707/104.1 |
| 6,591,300 | B1 | 7/2003 | Yurkovic | |
| 7,108,173 | B1 * | 9/2006 | Wang et al. .............. | 235/377 |
| 7,343,312 | B2 * | 3/2008 | Capek et al. ............. | 705/8 |
| 7,395,221 | B2 * | 7/2008 | Doss et al. ............... | 705/9 |
| 2001/0014866 | A1 * | 8/2001 | Conmy et al. ............. | 705/9 |
| 2002/0188490 | A1 | 12/2002 | Kruse | |
| 2003/0005055 | A1 * | 1/2003 | Ralston et al. ............ | 709/204 |
| 2004/0039579 | A1 * | 2/2004 | Chithambaram et al. .... | 705/1 |
| 2004/0044556 | A1 | 3/2004 | Brady et al. | |

(Continued)

OTHER PUBLICATIONS

"CyberMatrix Meeting Manager™: Office Meeting Scheduler," © 1998-2004 CyberMatrix Corporation, Inc., http://www.cyber-matrix.com/cmm.html [last accessed Jul. 6, 2006].
"Schedulelt Scheduling Software," Scheduling Software for events, staff, rooms, equipment and resources, © Copyright 2003-04, Mark Ballance, http://www.scheduleit.co.uik/, [last accessed Jul. 6, 2006].

(Continued)

*Primary Examiner*—Ashok B Patel
*Assistant Examiner*—Andrew Goldberg
(74) *Attorney, Agent, or Firm*—Perkins Coie LLP (57) ABSTRACT

A meeting location availability system determines the meeting locations that are available for use during a specified meeting time and suggests some or all of the available meeting locations as possible locations for conducting a meeting at the specified meeting time. The meeting location availability system maintains meeting location information, such as the preferred meeting locations, for each user. The meeting location availability system may then determine the meeting locations that are available for a meeting between meeting attendees at a specified meeting time by identifying the meeting locations for all of the meeting attendees and, from these meeting locations, identifying the meeting locations that are available for use during the specified meeting time. The meeting location availability system may then suggest some or all of the identified available meeting locations as possible locations for conducting the meeting at the specified meeting time.

16 Claims, 5 Drawing Sheets

U.S. PATENT DOCUMENTS

| | | | |
|---|---|---|---|
| 2005/0071213 A1* | 3/2005 | Kumhyr et al. | 705/8 |
| 2005/0119927 A1* | 6/2005 | Patel | 705/8 |
| 2005/0197877 A1 | 9/2005 | Kalinoski | |
| 2005/0273372 A1* | 12/2005 | Bowne et al. | 705/5 |
| 2006/0009987 A1* | 1/2006 | Wang | 705/1 |
| 2006/0015376 A1 | 1/2006 | Sattler et al. | |
| 2006/0045030 A1* | 3/2006 | Bieselin | 370/260 |
| 2006/0101020 A1 | 5/2006 | Aaron | |
| 2006/0200374 A1* | 9/2006 | Nelken | 705/9 |
| 2006/0224969 A1* | 10/2006 | Marston | 715/753 |
| 2007/0027889 A1* | 2/2007 | Kaufman | 707/101 |
| 2007/0106725 A1* | 5/2007 | Starr et al. | 709/204 |

OTHER PUBLICATIONS

"To see when people, rooms, and resources are free for a meeting," online Lotus Notes 6.5 Help, Calendar and Scheduling, http://www-12.lotus.com/ldd/doc/domino_notes/6.5/help65_client.nsf/f4b82fbb75e942a6852566ac0037f284/94bdd37d23927b8d85256d9b0059af3d?OpenDocument, [last accessed Jul. 6, 2006].

* cited by examiner

SUGGESTING MEETING LOCATIONS FOR CONDUCTING MEETINGS

BACKGROUND

Efficient communication and collaboration among members of an organization is critical to the organization's success. Although the proliferation of computers and the advent of the Internet have brought about a number of alternatives to the traditional face-to-face meeting, face-to-face meetings still remain the predominant manner of communicating among organization members.

Currently, a number of software applications are available for scheduling meetings among members of an organization. Many calendaring applications allow a meeting organizer to view the schedules of the intended meeting attendees in order to find time periods when all of the intended meeting attendees are free and available to attend a meeting. Even though these calendaring applications provide increased efficiency and benefits, for example, by simplifying the task of finding time periods when all of the intended meeting attendees are available to attend a meeting, the calendaring applications still require the meeting organizer to find meeting locations (e.g., conference rooms) that are available at the identified time periods.

For example, the meeting organizer first uses the calendaring application to find an available meeting time period to propose for a meeting. Having decided upon a particular time period to propose for the meeting, the meeting organizer typically accesses a separate room reservation application to determine whether any suitable conference rooms are available for the proposed time period. Not all conference rooms managed by the room reservation application may be desirable to the meeting organizer. For example, the meeting organizer may prefer to find a conference room that is in or near the building in which the organizer is located. Using the room reservation application to find a desirable conference room that is available for conducting the meeting in at the proposed time period may be a non-trivial task. For example, the meeting organizer needs to know the room numbers of the conference rooms that are desirable to the meeting organizer. If the meeting organizer does not know the room numbers, the meeting organizer has to perform a search for the room numbers of the desirable conference rooms. Having identified the room numbers of the desirable conference rooms, the meeting organizer then has to determine whether any of the corresponding conference rooms are free during the proposed time period. If none of the conference rooms are free, the meeting organizer has to return to the calendaring application to pick a new time period to propose for the meeting. Subsequent to picking the new time period, the meeting organizer again accesses the room reservation application and repeats the tedious process of finding a desirable conference room that is free during the newly proposed time period. The meeting organizer may have to repeat this process numerous times before finally finding both an appropriate time period to propose for the meeting and a desirable conference room that is available during that time period. Having found a combination of an available time period to propose for the meeting and a desirable conference room available to hold the meeting in, the meeting organizer uses the room reservation application to reserve the conference room for the proposed meeting time period, and the calendaring application to send out meeting invitations to the intended meeting attendees.

SUMMARY

A method and system for suggesting meeting locations for conducting meetings at specified meeting times is provided. A meeting location availability system determines the meeting locations that are available for use during a specified meeting time and suggests some or all of the available meeting locations as possible locations for conducting a meeting at the specified meeting time. The meeting location availability system maintains meeting location information for each user. The meeting location information for a user may, for example, be the meeting locations that are preferred by the user. The meeting location availability system may then determine the meeting locations that are available for a meeting between meeting attendees at a specified meeting time by identifying the meeting locations for all of the meeting attendees and, from these meeting locations, identifying the meeting locations that are available for use during the specified meeting time. The meeting location availability system may then suggest some or all of the identified available meeting locations as possible locations for conducting the meeting at the specified meeting time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for suggesting meeting locations for conducting meetings at specified meeting times is provided. In some embodiments, a meeting location availability system determines the meeting locations that are available for use during a specified meeting time and suggests some or all of the available meeting locations as possible locations for conducting a meeting at the specified meeting time. The meeting location availability system maintains meeting location information for each user. The meeting location information for a user may, for example, be the meeting locations that are preferred by the user. The meeting location availability system may then determine the meeting locations that are available for a meeting between meeting attendees at a specified meeting time by identifying the meeting locations for all of the meeting attendees and, from these meeting locations, identifying the meeting locations that are available for use during the specified meeting time. The meeting location availability system may then suggest some or all of the identified available meeting locations as possible locations for conducting the meeting at the specified meeting time.

Figure 1:
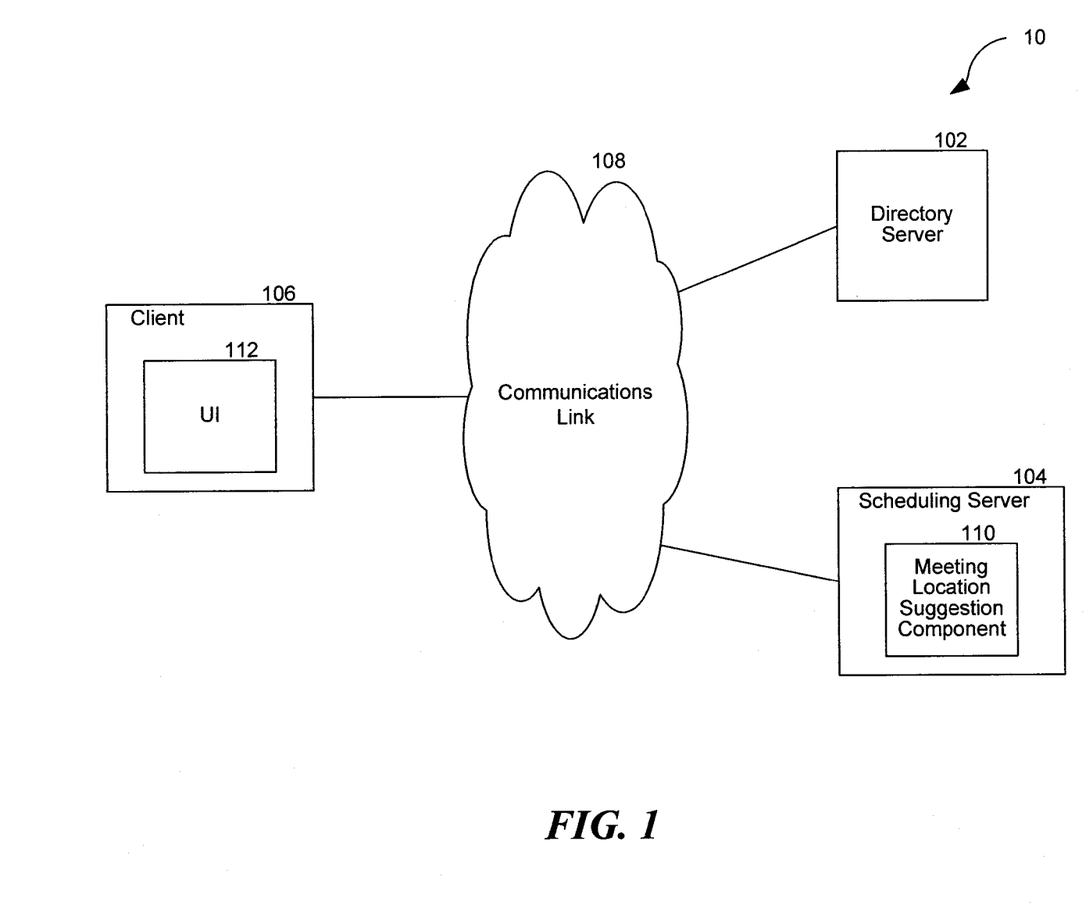
FIG. 1 is a block diagram that illustrates selected components of a meeting location availability system, according to some embodiments.

FIG. 1 is a block diagram that illustrates selected components of a meeting location availability system, according to some embodiments. A meeting location availability system 10 includes a directory server 102, a scheduling server 104, and a client 106, each coupled to a communications link 108. The directory server manages the static information regarding the users of the meeting location availability system. For each user, the static information may include, by way of example, the location of the user's office, the user's contact information, the user's position or title within the organization, the user's preferred meeting locations (i.e., the meeting locations that are preferred by the user), and other information regarding the user. The static information may also include information regarding the organization or organizations to which the users belong, such as, by way of example, the organizational structure, the buildings utilized by an organization, the layout or positioning of the buildings, the proximity of each building relative to the other buildings, the meeting locations contained in each building, the location of the meeting locations within each building, the size of each meeting location, the meeting facilities supported in each meeting location, and other information and data regarding the organization's buildings. In general terms, the scheduling server manages the scheduling information (e.g., free/busy information) for the meeting locations supported by the meeting location availability system. The scheduling server includes a meeting location suggestion component 110. The meeting location suggestion component identifies the available meeting locations to suggest to a requesting user using information related to the meeting attendees and a specified meeting time. The scheduling server may also manage the scheduling of the meeting locations supported by the meeting location availability system. The client corresponds to the client application component of the meeting location availability system. The client includes a user interface (UI) 112 with which users can access the services provided by the meeting location availability system. For example, the UI may enable a user to input the meeting attendees and a specified meeting time, and query the scheduling server to suggest meeting locations that are available during the specified meeting time. The meeting location suggestion component of the scheduling server can then identify the meeting locations that are available during the specified meeting time, determine which of the identified available meeting locations to suggest to the user, and suggest the appropriate available meeting locations to the user via the UI. In some embodiments, the UI interface enables the user to schedule one of the suggested available meeting locations for the meeting at the specified meeting time. When the user schedules one of the suggested meeting locations, the scheduling server reserves the specified meeting location for the duration of the specified meeting time for use by the user, thus making the meeting location unavailable for scheduling during the specified meeting time by other users.

In some embodiments, the scheduling server also manages the dynamic information regarding the users of the meeting location availability system. Dynamic information regarding a user may include information from which the meeting location availability system can determine or infer the location of the user at a specific time. For example, the meeting location availability system may be incorporated as part of an information management system that provides calendaring functionality, such as, by way of example, MICROSOFT's Exchange Server 2003. In this instance, the scheduling server may also provide calendaring services to the users. A user can then use the UI to view one or more other users' schedules (other meeting attendees' schedules), identify a time when the other users are available to attend a meeting, and request to schedule a meeting with the other users at the identified time (i.e., the specified meeting time). The meeting location suggestion component of the scheduling server can then identify the meeting locations that are available during the specified meeting time, determine which of the identified available meeting locations to suggest to the user, and provide the appropriate available meeting locations to the scheduling server. The meeting location suggestion component may use the dynamic information regarding the user in determining the available meeting locations to suggest to the user. The meeting location suggestion component may also use the dynamic information regarding the other meeting attendees in determining the available meeting locations to suggest to the user. The calendaring service may provide the dynamic information regarding the users, such as, by way of example, each user's meeting location preceding the specified meeting time ("current meeting location") and/or meeting location subsequent to the specified meeting time ("next meeting location"). The meeting location suggestion component may then consider each user's current meeting location and next meeting location in determining the meeting locations to suggest. The scheduling server can then suggest the appropriate available meeting locations to the user via the UI. When the user selects one of the suggested meeting locations, the scheduling server can schedule a meeting with the other users at the specified meeting time, and reserve the specified meeting location for the duration of the specified meeting time for use by the user, thus making the meeting location unavailable for scheduling during the specified meeting time by other users.

In some embodiments, the meeting location availability system provides a programmatic interface through which applications can query the meeting location availability system for available meeting locations during a specified meeting time. For example, a remote application can use the provided programmatic interface to send to the meeting location availability system a request for available meeting locations, including the identities of one or more meeting attendees and an indication of a specified meeting time. The meeting location availability system can then respond to the remote application by returning indications of the meeting locations that are available during the specified meeting time.

The computing device on which the meeting location availability system is implemented may include a central processing unit, memory, input devices (e.g., keyboard and pointing devices), output devices (e.g., display devices), and storage devices (e.g., disk drives). The memory and storage devices are computer-readable media that may contain computer executable instructions that implement the meeting location availability system. As used herein, "computer-readable media encoded with computer executable instructions" means computer-readable media comprising computer executable instructions. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the various components of the meeting location availability system may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The meeting location availability system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
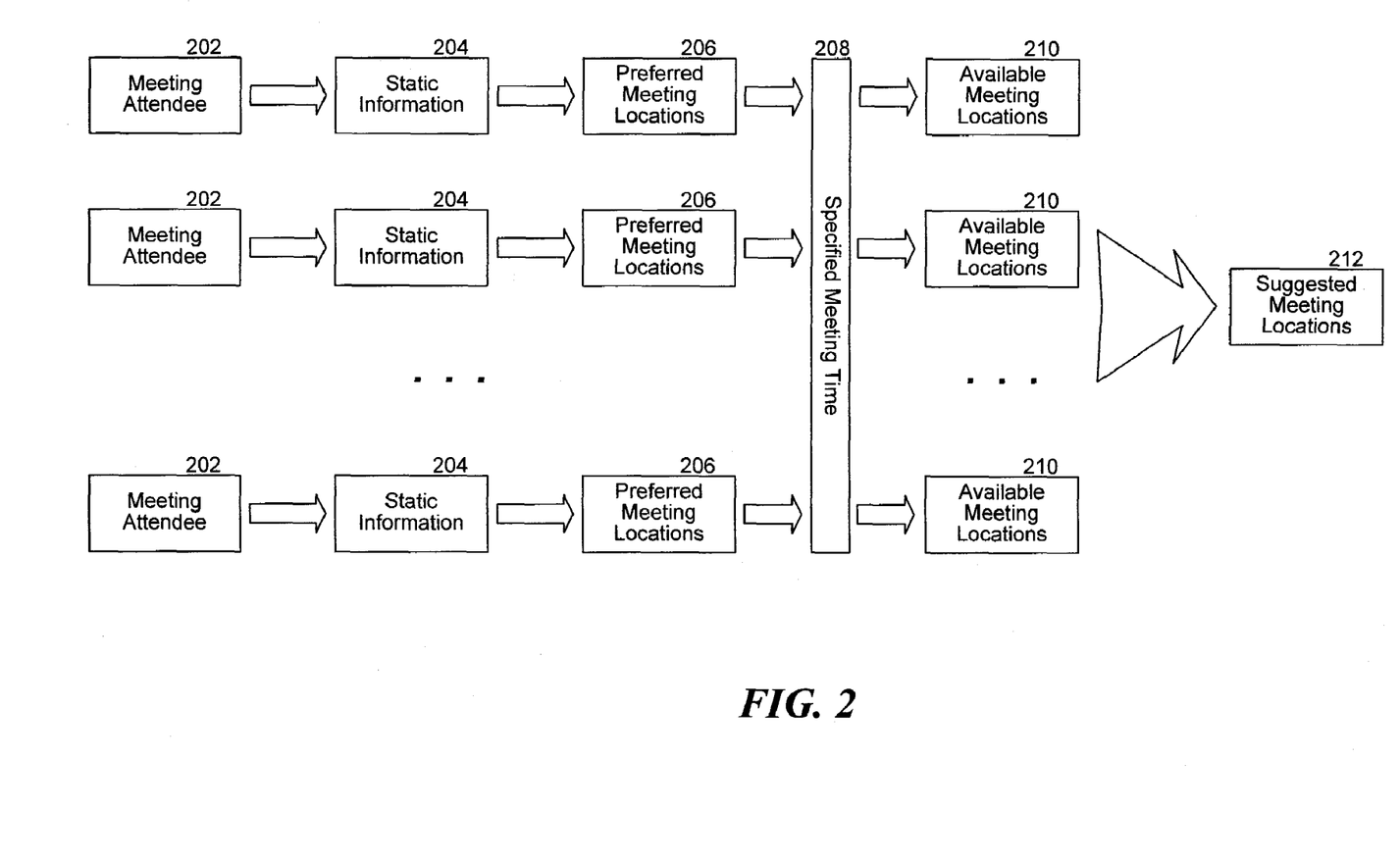
FIG. 2 is a block diagram that conceptually illustrates the determination of suggested meeting locations using static information regarding meeting attendees, according to some embodiments.

FIG. 2 is a block diagram that conceptually illustrates the determination of suggested meeting locations using static information regarding meeting attendees, according to some embodiments. The meeting location availability system starts with a plurality of meeting attendees 202 who are going to be invited to attend a meeting. For each meeting attendee, the meeting location availability system applies static information 204 regarding the meeting attendee to identify a list of preferred meeting locations 206. The static information may be the meeting attendee's office location. The list of preferred meeting locations (i.e., the meeting locations that are preferable to the meeting attendee) may then be comprised of the meeting locations that are in the same building as the meeting attendee's office, the meeting locations that are in buildings within a predetermined distance from the building in which the meeting attendee's office is located, the meeting locations that are in buildings within a predetermined distance from the building in which the meeting attendee's office is located and which are in the direction of the other meeting attendees' office locations (i.e., the buildings in which the other meeting attendees' offices are located), and any combination thereof. In some embodiments, the meeting attendee may specify one or more meeting locations as his or her preferred meeting location(s). The meeting location availability system uses the list of preferred meeting locations and, based on a specified meeting time 208, creates a list of available meeting locations 210 for each meeting attendee. The list of available meeting locations includes the meeting locations from the list of preferred meeting locations that are available for use during the specified meeting time. The meeting location availability system may then create a list of suggested meeting locations from the available meeting locations identified in the lists of available meeting locations created for the meeting attendees. For example, the list of suggested meeting locations may include a predetermined number, such as, by way of example, three, four, ten, etc., of the available meeting locations from the lists of available meeting locations created for the meeting attendees.

Figure 3:
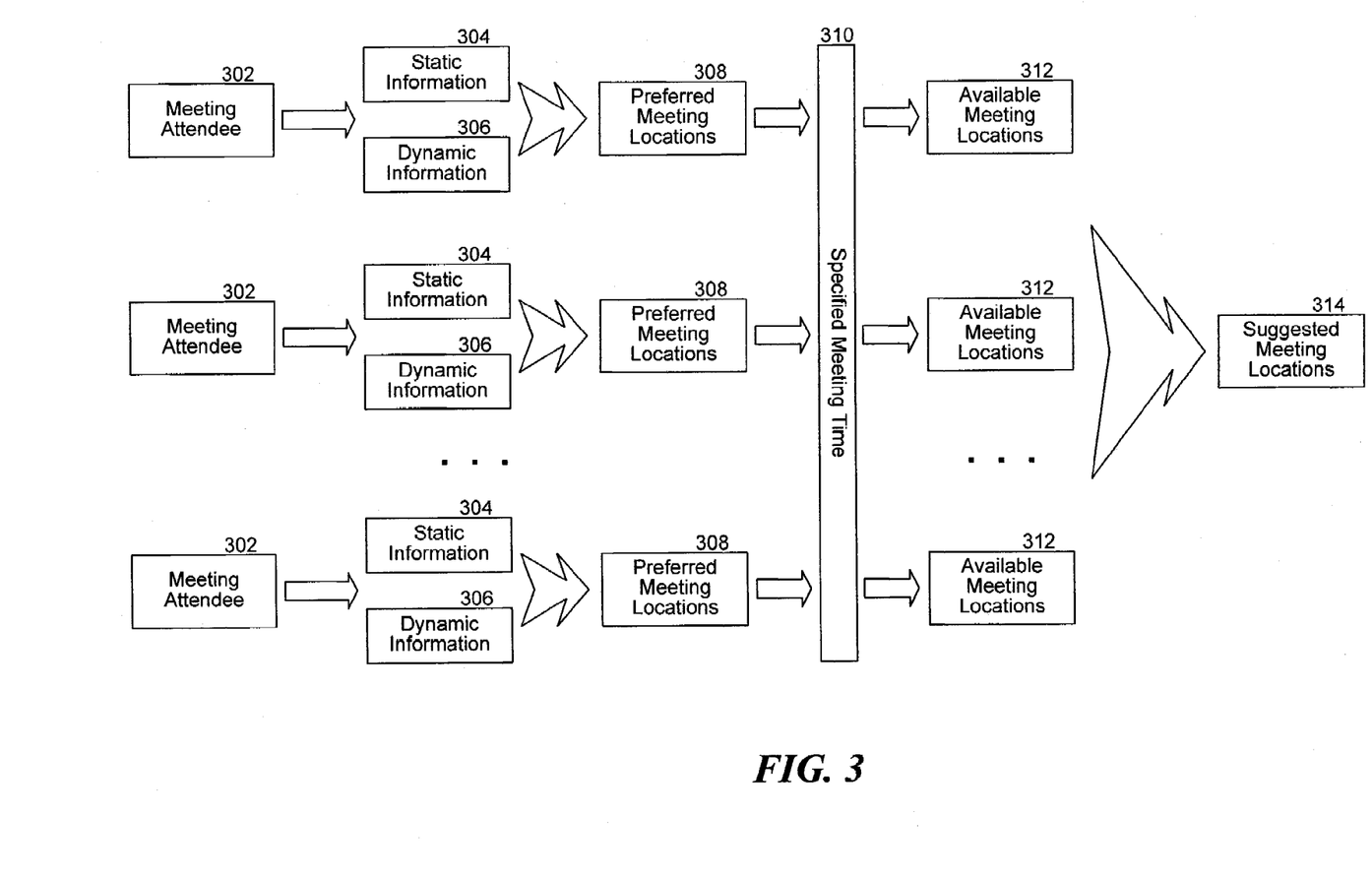
FIG. 3 is a block diagram that conceptually illustrates the determination of suggested meeting locations using both static and dynamic information regarding meeting attendees, according to some embodiments.

FIG. 3 is a block diagram that conceptually illustrates the determination of suggested meeting locations using both static and dynamic information regarding meeting attendees, according to some embodiments. The meeting location availability system starts with a plurality of meeting attendees 302 who are going to be invited to attend a meeting. For each meeting attendee, the meeting location availability system applies static information 304 and dynamic information 306 regarding the meeting attendee to identify a list of preferred meeting locations 308. As discussed above, the static information may be the meeting attendee's office location. The dynamic information may be the meeting attendee's location proximate to (e.g., immediately proceeding or immediately after) the specified time of the meeting. For example, the dynamic information may be the meeting attendee's current meeting location and/or next meeting location. The list of preferred meeting locations may then be comprised of the meeting locations that are in the same building as the meeting attendee's office, the meeting locations that are in buildings within a predetermined distance from the building in which the meeting attendee's office is located, the meeting locations that are in buildings within a predetermined distance from the building in which the meeting attendee's office is located and which are in the direction of the other meeting attendees' office locations, the meeting locations that are proximate to the meeting attendee's current meeting location (e.g., current meeting location, meeting locations in the same building as the current meeting location, meeting locations in buildings within a predetermined distance from the current meeting location, etc.), the meeting locations that are proximate to the meeting attendee's next meeting location (e.g., next meeting location, meeting locations in the same building as the next meeting location, meeting locations in buildings within a predetermined distance from the next meeting location, etc.), and any combination thereof. The meeting location availability system uses the list of preferred meeting locations and, based on a specified meeting time 310, creates a list of available meeting locations 312 for each meeting attendee. The meeting location availability system may then create a list of suggested meeting locations from the available meeting locations identified in the lists of available meeting locations created for the meeting attendees. For example, the list of suggested meeting locations may include a predetermined number of the available meeting locations from the lists of available meeting locations created for the meeting attendees.

In some embodiments, the list of suggested meeting locations includes all of the available meeting locations identified in the lists of available meeting locations created for the meeting attendees. In some embodiments, the list of suggested meeting locations includes a predetermined number, such as, by way of example, two, three, etc., of the available meeting locations from each of the lists of available meeting locations created for the meeting attendees. In some embodiments, the list of suggested meeting locations includes a predetermined number, such as, by way of example, ten, fifteen, etc., of the available meeting locations most commonly identified in the lists of available meeting locations created for the meeting attendees. In some embodiments, the list of suggested meeting locations includes the available meeting locations that are identified in at least a predetermined threshold number of the lists of available meeting locations created for the meeting attendees. The predetermined threshold number may vary depending on the specified number of meeting attendees. In some embodiments, the list of suggested meeting locations includes the available meeting locations from the lists of available meeting locations that are convenient to the meeting attendee who is querying the meeting location availability system. In some embodiments, the list of suggested meeting locations includes a predetermined number of the available meeting locations from the lists of available meeting locations that are convenient to at least a predetermined threshold number of the meeting attendees.

In some embodiments, the meeting location availability system prioritizes (or ranks) the available meeting locations identified in the lists of available meeting locations created for the meeting attendees. For example, for each meeting attendee, the meeting location availability system may rank the available meeting locations identified in the list of available meeting locations by positioning the available meeting locations that are located in the same building as the meeting attendee's office higher in, or closer to the top of, the list. The meeting location availability system may then rank the remaining available meeting locations according to building proximity (i.e., the available meeting locations in buildings located closer to the building in which the meeting attendee's office is located is ranked higher in the list than the available meeting locations in buildings located further from the building in which the meeting attendee's office is located). In another example, for each meeting attendee, the meeting location availability system may also rank the remaining available meeting locations according to its proximity to the meeting attendee's location proximate to the specified time of the meeting. For example, if the meeting attendee is scheduled to be in Building A just prior to the specified time of the meeting, the available meeting locations in Building A may be ranked higher in the list of available meeting locations than the available meeting locations that are in buildings other than Building A. The meeting location availability system may then create a list of suggested meeting locations from the lists of available meeting locations created for the meeting attendees. For example, the meeting location availability system may include a predetermined number, such as three, five, etc., of the highest ranking available meeting locations from each of the lists of available meeting locations in the list of suggested meeting locations. In another example, the list of suggested meeting locations may include a predetermined number of the highest ranking available meeting locations that are identified in at least a predetermined threshold number of the lists of available meeting locations created for the meeting attendees.

In some embodiments, the meeting location availability system prioritizes the available meeting locations identified in the list of suggested meeting locations according to location commonality. Within the list of suggested meeting locations, an available meeting location that is included in a larger number of the lists of available meeting locations may be ranked higher than an available meeting location that is included in a smaller number of the lists of available meeting locations. For example, an available meeting location that appears in four of the lists of available meeting locations is ranked or positioned higher in the list of suggested meeting locations than an available meeting location that appears in three of the lists of available meeting locations. In this manner, the available meeting locations identified in the list of suggested meeting locations may be ordered according to their respective degree of commonality across the lists of available meeting locations (i.e., respective degree of commonality across the meeting attendees). The meeting location availability system can then suggest the available meeting locations from the list of suggested meeting locations in priority order. In some embodiments, the meeting location availability system prioritizes the available meeting locations identified in the list of suggested meeting locations based on convenience to the meeting attendee who is querying the meeting location availability system. For example, the available meeting locations that are more proximate to the office of the meeting attendee who is querying the meeting location availability system may be ranked higher in the list. In some embodiments, the meeting location availability system prioritizes the available meeting locations identified in the list of suggested meeting locations based on the level or degree of convenience to the meeting attendees. For example, within the list of suggested meeting locations, an available meeting location that is convenient to a larger number of the meeting attendees may be ranked higher than an available meeting location that is convenient to a smaller number of the meeting attendees.

In some embodiments, the meeting location availability system removes from (or does not include in) the list of suggested meeting locations the meeting locations that are not of adequate size for a meeting involving the number of meeting attendees. In some embodiments, the meeting location availability system removes from (or does not include in) the list of suggested meeting locations the meeting locations that do not contain the proper equipment (i.e., proper meeting facilities). For example, a meeting organizer may have requested specific capabilities, such as, by way of example, video, voice, etc., to be available for a meeting. The meeting location availability system can then recommend the meeting locations that are equipped to provide the requested capabilities.

Figure 4:
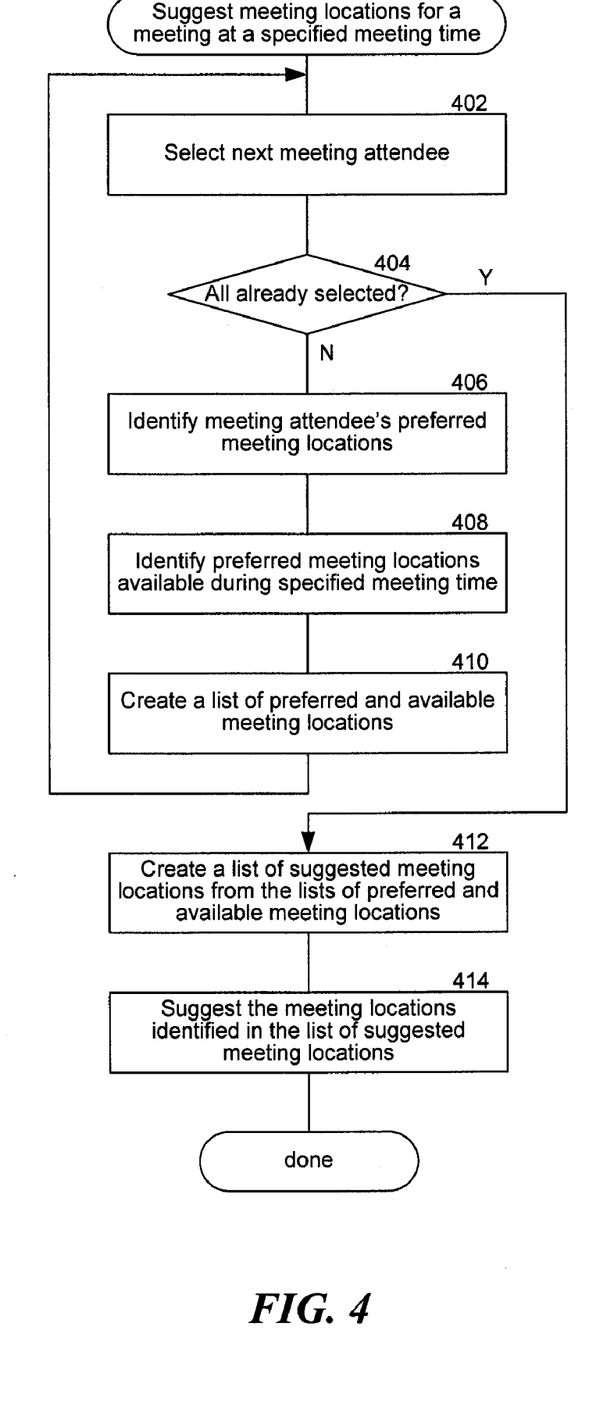
FIG. 4 is a flow diagram that illustrates the processing of the meeting location suggestion component to provide a list of suggested meeting locations, according to some embodiments.

FIG. 4 is a flow diagram that illustrates the processing of the meeting location suggestion component to provide a list of suggested meeting locations, according to some embodiments. The meeting location suggestion component is passed a list of meeting attendees and a specified time for a meeting. In block 402, the meeting location suggestion component selects the next meeting attendee from the list of meeting attendees. In decision block 404, if all of the meeting attendees have been selected, then the meeting location suggestion component continues at block 412, else the meeting location suggestion component continues at block 406. In block 406, the meeting location suggestion component identifies the meeting attendee's preferred meeting locations. For example, the preferred meeting locations may be the meeting locations in the same building as the meeting attendee's office, the meeting locations located near the meeting attendee's location around the specified time of the meeting, and the like. The meeting attendee's preferred meeting locations may have been previously identified and cached in local memory. In block 408, the meeting location suggestion component identifies the meeting attendee's preferred meeting locations that are available (i.e., free, not scheduled) during the specified meeting time. In block 410, the meeting location suggestion component creates a list of preferred and available meeting locations for the meeting attendee. The meeting location suggestion component then loops to block 402 to select the next meeting attendee from the list of meeting attendees. In block 412, the meeting location suggestion component creates a list of suggested meeting locations from the lists of preferred and available meeting locations which were created for the meeting attendees. For example, the list of suggested meeting locations may include all of the meeting locations contained in the lists of preferred and available meeting locations. In another example, the list of suggested meeting locations may include a predetermined number of the meeting locations contained in the lists of preferred and available meeting locations, a predetermined number of the meeting locations from each of the lists of preferred and available meeting locations, a predetermined number of the most common meeting locations contained in the lists of preferred and available meeting locations, a predetermined number of the meeting locations from the lists of preferred and available meeting locations that are convenient to at least a predetermined number of the meeting attendees, a predetermined number of the meeting locations from the lists of preferred and available meeting locations that are convenient to the meeting attendee who input the list of meeting attendees and the specified time for the meeting, and other combinations of the meeting locations contained in the lists of preferred and available meeting locations. In block 414, the meeting location suggestion component suggests the meeting locations contained in the list of suggested meeting locations as possible locations to conduct the meeting, and completes. For example, the meeting locations contained in the list of suggested meeting locations may be presented on the UI as possible locations to conduct the meeting at the specified meeting time.

One skilled in the art will appreciate that, for this and other processes and methods disclosed herein, the functions/steps performed in the processes and methods may be altered in various ways. For example, the order of the outlined steps is only exemplary, and the steps may be rearranged, some of the steps may be optional, substeps may be performed in parallel, some of the steps may be combined into fewer steps or expanded into additional steps, other steps may be included, etc.

Figure 5:
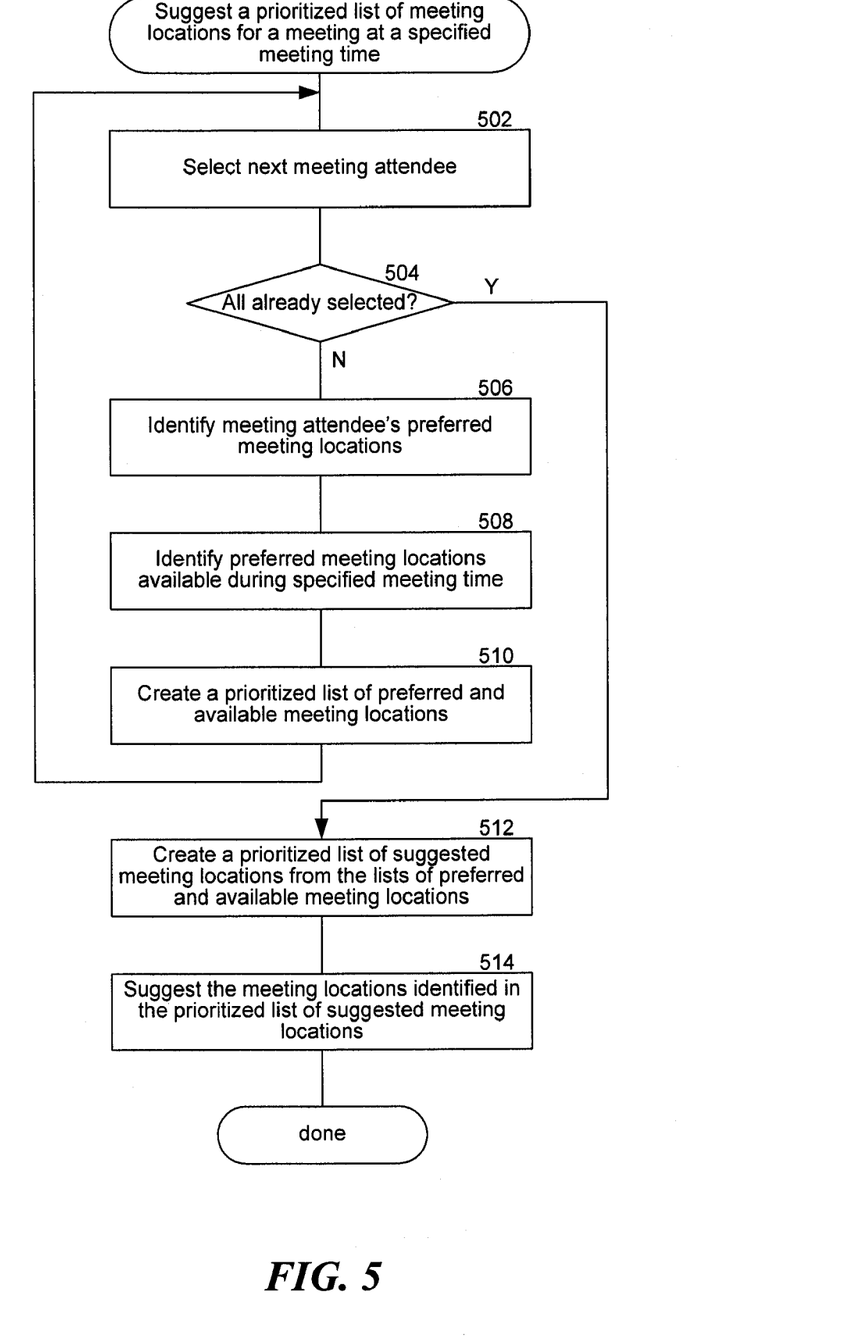
FIG. 5 is a flow diagram that illustrates the processing of the meeting location suggestion component to provide a prioritized list of suggested meeting locations, according to some embodiments.

FIG. 5 is a flow diagram that illustrates the processing of the meeting location suggestion component to provide a prioritized list of suggested meeting locations, according to some embodiments. The meeting location suggestion component is passed a list of meeting attendees and a specified time for a meeting. In block 502, the meeting location suggestion component selects the next meeting attendee from the list of meeting attendees. In decision block 504, if all of the meeting attendees have been selected, then the meeting location suggestion component continues at block 512, else the meeting location suggestion component continues at block 506. In block 506, the meeting location suggestion component identifies the meeting attendee's preferred meeting locations. In block 508, the meeting location suggestion component identifies the meeting attendee's preferred meeting locations that are available during the specified meeting time. In block 510, the meeting location suggestion component creates a prioritized list of preferred and available meeting locations for the meeting attendee. For example, the meeting locations contained in the list of preferred and available meeting locations may be prioritized based on factors such as a meeting location's proximity to the meeting attendee's office location, a meeting location's proximity to the location of the meeting attendee proximate to the specified time of the meeting, the meeting attendee's preference for a meeting location, preference rules specified by the meeting attendee, and the like. As an example of a preference rule, the meeting attendee may have specified that meeting locations that are convenient to a larger number of the meeting attendees are to be prioritized higher than meeting locations that are convenient to a smaller number of meeting attendees. As another example, the meeting attendee may have specified that particular meeting locations are to be given the highest priority. The meeting location suggestion component then loops to block 502 to select the next meeting attendee from the list of meeting attendees. In block 512, the meeting location suggestion component creates a prioritized list of suggested meeting locations from the prioritized lists of preferred and available meeting locations which were created for the meeting attendees. For example, the prioritized list of suggested meeting locations may include all or some of the meeting locations contained in the prioritized lists of preferred and available meeting locations. The meeting locations in the prioritized list of suggested meeting locations may be prioritized based on factors similar to the factors used in prioritizing the meeting locations in the prioritized lists of preferred and available meeting locations discussed above. In block 514, the meeting location suggestion component suggests, in priority order, the meeting locations contained in the prioritized list of suggested meeting locations as possible locations to conduct the meeting, and completes. For example, the meeting locations contained in the prioritized list of suggested meeting locations may be presented on the UI, with the higher priority meeting locations appearing before the lower priority meeting locations, as possible locations to conduct the meeting at the specified meeting time.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computer system for suggesting meeting locations for a meeting at a specified meeting time, each meeting location being a specific conference room, the method comprising:

for each meeting attendee,
identifying preferred meeting locations that are preferred by the meeting attendee by receiving from the meeting attendee a specification of preferred meeting locations that are conference rooms;
identifying additional preferred meeting locations for the meeting attendee, an additional preferred meeting location is identified based on a location of a meeting that the meeting attendee will be attending at a time that is adjacent to the specified meeting time as indicated by a calendar of the meeting attendee; and
creating a list of preferred and available meeting locations, the list of preferred and available meeting locations containing the identified preferred meeting locations and the additional preferred meeting locations that are available for use during the specified meeting time;

identifying meeting locations that are common to the lists of preferred and available meeting locations of the meeting attendees;

creating a list of suggested meeting locations, the list of suggested meeting locations containing a predetermined number of meeting locations from the identified common meeting locations; and suggesting the meeting locations in the list of suggested meeting locations as possible locations to conduct the meeting wherein a meeting location that is not of adequate size for the meeting is not included in the suggested meeting locations.

2. The method of claim 1, wherein the list of suggested meeting locations contains all of the meeting locations in the lists of preferred and available meeting locations.

3. The method of claim 1, wherein the list of suggested meeting locations is ordered according to location commonality, such that the meeting locations having a higher degree of commonality across the lists of preferred and available meeting locations are suggested before the meeting locations having a lower degree of commonality.

4. The method of claim 1, wherein the meeting locations preferred by the meeting attendee includes meeting locations located in a building in which the meeting attendee's office is located.

5. The method of claim 4, wherein the meeting locations preferred by the meeting attendee further includes meeting locations in buildings neighboring the building in which the meeting attendee's office is located.

6. The method of claim 1, wherein the meeting locations preferred by the meeting attendee include the meeting attendee's next meeting location.

7. A computer-readable storage medium encoded with computer executable instructions for suggesting meeting locations for a meeting at a specified meeting time, each meeting location being a specific conference room, by a method comprising:

for each meeting attendee,
creating a list of preferred meeting locations that are preferred by the meeting attendee by receiving from the meeting attendee a specification of preferred meeting locations that are conference rooms;
adding an additional preferred meeting location for the meeting attendee to the list of preferred meeting locations, the additional preferred meeting location is identified based on a location of a meeting that the meeting attendee will be attending at a time that is adjacent to the specified meeting time as indicated by a calendar of the meeting attendee; and
creating a list of preferred and available meeting locations, the list of preferred and available meeting locations containing the meeting locations from the list of preferred meeting locations that are available for use during the specified meeting time;

creating a list of suggested meeting locations, the list of suggested meeting locations containing a predetermined number of meeting locations from the meeting attendees' lists of preferred and available meeting locations; and suggesting the meeting locations in the list of suggested meeting locations as possible locations to conduct the meeting wherein a meeting location that is not of adequate size for the meeting is not included in the suggested meeting locations.

8. The computer-readable storage medium of claim 7, wherein the list of suggested meeting locations contains all of the meeting locations in the lists of preferred and available meeting locations.

9. The computer-readable storage medium of claim 7, including adding to the list of preferred meeting locations preferred by the meeting attendee meeting locations proximate to the meeting attendee's location immediately preceding the specified meeting time.

10. The computer-readable storage medium of claim 7, including adding to the list of preferred meeting locations preferred by the meeting attendee meeting locations proximate to the meeting attendee's location immediately succeeding the specified meeting time.

11. The computer-readable storage medium of claim 7, including:
ordering the predetermined number of meeting locations in the list of suggested meeting locations based on priority; and
suggesting the meeting locations in the list of suggested meeting locations in priority order as possible locations to conduct the meeting.

12. The computer-readable storage medium of claim 11, wherein the priority is based on meeting location commonality, such that the meeting locations having a higher degree of commonality across the meeting attendees' lists of preferred and available meeting locations are ordered higher than meeting locations having a lower degree of commonality.

13. A computing device for suggesting meeting locations for a meeting at a specified meeting time, the computing device comprising:
a memory that stores computer-executable instructions for
a component that generates a list of preferred meeting locations for each meeting attendee based on proximity of meeting locations to the meeting attendee's office location, the list of preferred meeting locations comprises at least one meeting location;
a component that adds an additional preferred meeting location for the meeting attendee to the list of preferred meeting locations for each meeting attendee, the additional preferred meeting location is identified based on a location of a meeting that the meeting attendee will be attending at a time that is adjacent to the specified meeting time as indicated by a calendar of the meeting attendee; and
a component that generates a list of preferred and available meeting locations for each meeting attendee, the list of preferred and available meeting locations containing the meeting locations in the meeting attendee's list of preferred meeting locations that are available for use during the specified meeting time;
a component that generates a list of suggested meeting locations for the meeting from the lists of preferred and available meeting locations; and
a component that suggests the meeting locations in the list of suggested meeting locations as possible locations to conduct the meeting, wherein each meeting location that is not of adequate size for the meeting is not included in the suggested meeting locations; and
a processor for executing the computer-executable instructions stored in the memory.

14. The computing device of claim 13, wherein the meeting locations in the list of meeting locations preferred by the meeting attendee is specified by the meeting attendee.

15. The computing device of claim 13, wherein the meeting locations in the list of suggested meeting locations is ordered according to location commonality, such that the meeting locations having a higher degree of commonality across the lists of the preferred and available meeting locations are suggested before the meeting locations having a lower degree of commonality.

16. The computing device of claim 13, wherein the list of suggested meeting locations includes at least one meeting location common to a plurality of the lists of preferred and available meeting locations.

* * * * *